Patented Mar. 7, 1939

2,149,765

UNITED STATES PATENT OFFICE 2,149,765

PHOTOCHEMICAL PURIFICATION OF ACETIC ACID

Arthur W. Goos, Marquette, and James S. Owens, Midland, Mich., assignors to The Dow Chemical Company, Midland, Mich., a corporation of Michigan No Drawing. Application August 13, 1937, Serial No. 158,910

6 Claims. (Cl. 260—540)

This invention relates to a process for the purification of acetic acid, and especially to a photochemical process therefor.

Acetic acid derived from pyroligneous acid, which is in turn produced by the destructive distillation or carbonization of wood, is characterized by objectionable impurities which cause color in the acid, and which have ordinarily been removed therefrom by various chemical oxidation processes. Such methods have the disadvantage of relatively high cost, the requirement of a discontinuous method of manufacture, and result in a low yield of purified acid.

The aforesaid foreign materials cause a yellow to green coloration in the acetic acid. For purposes of comparison between solutions of acetic acid having such foreign coloring matter therein, we have set up a series of color standards based on the American Society for Testing Materials Designation 268—33, which defines a water-white liquid as one having a color equivalent to that of a solution of 0.003 gram of potassium dichromate in a liter of distilled water. For convenience, we designate the color of such a water-white solution as "A. S. T. M." 1, and solutions having color intensities equivalent to those of aqueous solutions containing multiples of 3 milligrams of potassium dichromate per liter are designated by the corresponding numeral, e. g. 0.006 gram of potassium dichromate per liter is referred to herein as "A. S. T. M." 2 and 0.15 gram of potassium dichromate per liter gives a color intensity we call "A. S. T. M." 50.

Crude acetic acid, when freshly prepared either from pyroligneous acid or by synthetic processes, may have a color varying from approximately "A. S. T. M." 5 to 50, or higher. Most users of acetic acid cannot employ a material having a color greater than "A. S. T. M." 3, and many applications of acetic acid require that the color approximate "A. S. T. M." 1.

It is, therefore, among the objects of this invention to provide a process whereby discolored acetic acid whether derived from pyroligneous acid or synthetic processes may be purified at low cost to produce good yields of substantially colorless ("A. S. T. M." 1) acetic acid. Another object of the invention is to provide a continuous process for the decolorization of acetic acid such that the normally occurring coloring materials therein are converted to a form from which the acid may readily be separated.

We have now found that the foregoing objects are readily attained by irradiation, under suitable conditions, of the discolored acetic acid such as is ordinarily produced from pyroligneous acid or, for example, from acetylene by synthetic processes. Our process relies for its effectiveness upon the newly discovered fact that "ultra-violet" radiation, having a wavelength below about 3000 Ångstrom units, decolorizes acetic acid, and converts the volatile discoloring impurities to a non-volatile form. As will be more fully pointed out in the following description, ultra-violet light is effective as a decolorizing agent when applied either to liquid acetic acid or to acetic acid vapor and may be utilized in either batch or continuous processes for improving the color of crude acetic acid.

The acetic acid utilized in the experiments to be described hereinafter was prepared by fractionally distilling crude anhydrous acetic acid having a color greater than "A. S. T. M." 50. The distillate was fractionated at atmospheric pressure through a 5-foot ring-packed column having an efficiency of approximately 5 theoretical plates. The distillate was divided into "heads" fractions and "middle" fractions for our further experimental work. Color comparisons between these fractions and "A. S. T. M." standard solutions showed the acetic acid to have colors varying from "A. S. T. M." 3 to greater than "A. S. T. M." 5.

The spectral range most effective for decolorizing acetic acid was determined by two methods, which checked one another rather closely. The first method involved determination of the absorption spectrum of the acetic acid. The second method involved irradiation of the acetic acid under selective color filters employing both a quartz mercury arc lamp and a 200 watt incandescent lamp. The acetic acid middle fraction, referred to above, showed no selective absorption but only a general absorption in the ultra-violet spectral region, such absorption being more marked with respect to the shorter wavelengths. The "heads" fraction showed a similar absorption which, on account of the yellowish-green color of the solution, extended a little further into the blue region of the visible spectrum than did the absorption exhibited by the middle fraction. The following table indicates the actual absorption characteristics of the different thicknesses of acetic acid in quartz tubes when exposed to light from a 3 ampere iron arc, using a medium quartz spectrograph.

| Specimen | Depth of solution | Absorption |
| --- | --- | --- |
| | Cm. | |
| Middle fraction | 1.0 | 100% below 2900 A. |
| Do | 6.0 | 100% below 3100 A. |
| Heads fraction | 1.0 | 50% from 3700 to 2900 A. |
| Do | 1.0 | 100% below 2900 A. |
| Do | 6.0 | 100% below 4500 A. |

In a large number of distillations carried out on colored samples of acetic acid middle fractions, we have discovered that a single distillation of a non-irradiated material gives a distillate of very nearly the same color as the original sample. A small amount of a yellow residue remains in the distilling flask. A similar distillation carried out on material equivalent to the heads fractions previously described and prior to irradiation gives a green distillate and a yellow residue. It would appear therefore that the material contributing the green color to crude acetic acid is volatile while a yellow coloration is due to non-volatile matter. We have found that both the distillate and the residue can be decolorized by irradiation, after which a single distillation of either the middle fraction or the heads fraction gives a clear distillate and a yellow residue. The water-white acetic acid produced by distillation of the irradiated material remains color-stable indefinitely. It appears therefore that irradiation produces a non-reversible conversion of the coloring agents normally present in crude acetic acid from a volatile to a non-volatile form.

Exposure of either of the fractions of substantially anhydrous crude acetic acid employed in our tests to the radiant energy from a quartz-mercury arc and to that from a 200 watt incandescent lamp, while the acetic acid was stored in brown glass bottles, clear glass bottles, clear glass bottles covered with "Sylvania old-gold rancidity resisting cellulose film" (which absorbs all wavelengths below 4000 Ångstroms), "Pyrex" bottles, and quartz bottles showed that no decolorizing effect was produced with visible light alone. Complete decolorization was produced by irradiation of the acetic acid in a quartz container with a quartz mercury arc. Our experiments indicate that the most effective spectral range for decolorizing acetic acid is between about 2000 and about 2700 Ångstrom units. Only quartz is completely permeable to radiant energy of this wave length.

The following examples illustrate the practice of our invention as applied to a decolorization and purification of acetic acid both in the liquid state and in the vapor phase.

Example 1

A General Electric 220 volt, "Uviarc" quartz mercury arc, operated at an arc voltage of 155 volts and an arc current of 3.5 amperes, was used to irradiate a series of samples of liquid acetic acid. The results are given in the following table in the first column of which, under the heading "Sample", the letter M refers to a material similar to the middle fraction described above, the letter H designates a "heads fraction" of acetic acid, the letters GH refer to a green colored distillate from a heads fraction, and the letters YR refer to a yellow colored distillation residue from a heads fraction.

| Sample | Volume, cc. | Thickness, cm. | Container | Exposure, minutes | "A. S. T. M." color Original | "A. S. T. M." color Final |
|---|---|---|---|---|---|---|
| M | 40 | 1.7 | Quartz-closed | 25 | 5+ | 0.5 |
| M | 40 | 1.7 | Quartz+oxygen | 10 | 5+ | 0.5 |
| M | 40 | 1.7 | Quartz+air | 5 | 5+ | 0.5 |
| M | 40 | 1.7 | Quartz+helium | 25 | 5+ | 0.7 |
| M | 40 | 1.7 | Quartz+air | 4.5 | 4.9 | 1.0 |
| M | 40 | 1.7 | Pyrex-closed | 180 | 5+ | 1.5 |
| M | 40 | 1.7 | Pyrex+oxygen | 20 | 5+ | 0.5 |
| M | 40 | 1.7 | Pyrex+air | 20 | 5+ | 0.2 |
| M | 400 | 5.4 | ___do___ | 42 | 5+ | 0.25 |
| H | 40 | 1.7 | Quartz+air | 50 | | 0.10 |
| GH | 40 | 1.7 | ___do___ | 35 | | 0.5 |
| YR | 40 | 1.7 | ___do___ | 60 | | 0.25 |

In the samples marked quartz + oxygen, quartz + helium, etc., the gas named was bubbled through the solution being irradiated in a container made of the material named.

By surrounding the mercury arc lamp with a layer of acid, 1.7 cm. thick, a volume of approximately 1100 cc. of discolored acetic acid can be decolorized in the time given for 40 cc. in the above table. We have also found that the discolored acetic acid cannot be decolorized without irradiation, either by maintaining the sample at about 85° C. over an extended period of time, or by bubbling oxygen therethrough while maintaining the temperature at 85° C. for more than 1.5 hours. No difference in the rate of decolorization was observed when the acetic acid was bleached in closed or open quartz containers. Irradiation in quartz tubes is about seven times more efficient than in "Pyrex" tubes. When oxygen or air is being bubbled through the sample during irradiation, bleaching is from two to four times as rapid in quartz tubes as in "Pyrex" tubes. When oxygen or air is bubbled through the sample only 20 per cent as much irradiation is required to decolorize acetic acid in a quartz container as when the material is being irradiated in a closed vessel without access to an oxygen-containing gas. When "Pyrex" is used as the container for the discolored acetic acid, irradiation requires only 10 per cent as long in the presence of oxygen or air as when these gases are not passed through the sample. In all cases air seems to be as effective as oxygen in facilitating the decolorizing operation. Inert gases, such as helium, appear to have no effect on the bleaching time. It must, therefore, be concluded that the results obtained when air or oxygen are bubbled through the solution during irradiation are due in part to the oxidizing action of such gases rather than to simple mechanical agitation supplied to the liquid by the passage of the gas therethrough.

It was observed that the irradiated samples which had not been subjected to subsequent distillation regained a portion of their color upon standing and that this color change was more noticeable when the product was stored in the dark than when stored in the light. To illustrate, a sample of acetic acid having a color of 5+, when decolorized to an "A. S. T. M." color of 0.1 and stored in the dark for one month, had at the end of that time a color of "A. S. T. M." 4. When, however, a sample of the same irradiated material was distilled immediately after irradiation, it remained water-white after standing in the dark for a month.

A series of samples of acetic acid middle fraction having an "A. S. T. M." color of 4.9 were measured into 45 cc. capacity quartz tubes 1.7 cm. in diameter. The samples were then subjected to irradiation for the length of time shown in the following table and were immediately thereafter distilled. The final color of the distilled material is given in the table.

| Exposure, minutes | Final color |
|---|---|
| 0 | 3.5 |
| 1 | 1.7 |
| 2 | 1.4 |
| 4 | 1.1 |
| 8 | 0.8 |

It is observed that distillation alone reduces the "A.S.T.M." color from 4.9 to 3.5 and that irradiation followed by distillation provides a substantially colorless acid in approximately one-third of the time required to attain the same degree of decolorization with irradiation alone, as is shown by reference to the first item in the first table of Example 1.

Example 2

A sample of colored acetic acid was distilled in an all quartz distilling flask having a side arm approximately 0.7 cm. in diameter. Arrangement was made to irradiate the acetic acid in the vapor state while the vapor was passing through said side arm, and before it entered a condenser, to which this arm was connected. The source of light was placed 7 cm. from the quartz tube through which the acetic acid vapor was passed during irradiation, and both were surrounded with a polished aluminum reflector 11.5 cm. in diameter. In order to study variations in irradiation time, two different distillation flasks were used, one having a side arm 16 cm. in effective length, and the other having an effective irradiation length of 75 cm. A sample of the middle fraction of acetic acid having an original color of "A. S. T. M." 5+, when subjected to two distillations without irradiation, had only been purified to the extent that its color was about "A. S. T. M." 4+. When, however, a sample of once distilled acetic acid was redistilled with 0.32 second exposure of the vapor to irradiation, its color was reduced to about "A. S. T. M." 1.0. When oxygen was passed through the distilling flask during irradiation, no effect was noticed upon the time required to reduce the color to the desired range.

To determine the amount of irradiation required to produce the satisfactorily purified acetic acid, a series of samples of the middle fraction having an "A. S. T. M." color of 4.9 were distilled through the apparatus described above and were irradiated in the vapor phase while passing through the quartz side arm of the distillation flask. The samples were subsequently redistilled and the final colorations were determined. The vapor thickness in each case was 0.7 centimeter. The results are given in the following table:

| Exposure, seconds | "A. S. T. M." color | | |
|---|---|---|---|
| | Before irradiation | After irradiation | |
| | | Before redistillation | Final color after redistillation |
| 0.10 | 4.9 | 4.0 | 3.0 |
| 0.14 | 4.9 | 4.0 | 2.8 |
| 0.38 | 4.9 | 3.0 | 2.1 |
| 0.63 | 4.9 | 2.8 | 2.1 |
| 1.39 | 4.9 | 3.0 | |
| 2.28 | 4.9 | 1.8 | 1.0 |

Comparison of the results obtained in this series of experiments with those recorded in the time study under Example 1 indicate that as much purification is obtained by irradiating acetic acid vapor for a period of about 3 seconds during distillation and subsequently redistilling the material as can be obtained by irradiating liquid acetic acid for a period between about 4 and about 8 minutes followed by distillation, and that these results are similar to those obtained by exposing liquid acetic acid to irradiation for approximately 25 minutes without subsequent distillation.

Some chemical evidence has been obtained that one of the materials contributing the yellow-green color to crude acetic acid is similar in nature to the compound diacetyl. To a decolorized sample of acetic acid having a color of approximately "A. S. T. M." 0.5 was added 0.05 per cent by weight of a substantially pure diacetyl, producing a solution having a color of "A. S. T. M." 5+. 40 cc. of this mixed acid was irradiated in a tube 1.7 cm. in diameter for a period of 15 minutes while a stream of air was slowly bubbled therethrough. The product was distilled leaving a yellow colored non-volatile residue in the distilling flask. The distillate had a color of "A. S. T. M." 0.5.

The most efficient purification process for acetic acid which we have as yet discovered consists in irradiating the discolored acetic acid for a period in itself insufficient to produce a completely decolorized product, which period is, however, sufficient to convert the volatile discoloring impurities to a non-volatile form, and thereafter distilling the acetic acid from said non-volatile materials.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:

1. The process which comprises subjecting acetic acid to the action of ultra-violet radiation for a period of time sufficient to convert discoloring agents therein which are volatile at the boiling point of acetic acid to a form which is non-volatile at that temperature, and thereafter redistilling the acetic acid.

2. The process which comprises subjecting acetic acid which contains as impurity a material such as diacetyl to the effect of ultra-violet radiation for a period of time sufficient to convert volatile diacetyl-type compounds therein to a material which is non-volatile at the boiling point of acetic acid, and thereafter redistilling the acetic acid.

3. The process which comprises subjecting acetic acid to the action of ultra-violet radiation of a wavelength below about 3000 Ångstrom units for a period of time sufficient to convert discoloring agents which are volatile at the boiling point of acetic acid therein to a form which is non-volatile at that temperature, and thereafter redistilling the acetic acid.

4. The process which comprises subjecting the vapor of acetic acid to ultra-violet irradiation during the distillation of such acetic acid and thereafter redistilling the irradiated acetic acid.

5. The process which comprises subjecting a discolored acetic acid to ultra-violet irradiation of a wavelength between about 2000 and about 2700 Ångstrom units for a period of time insufficient in itself to effect complete decolorization, and thereafter distilling the irradiated acetic acid.

6. The process which comprises subjecting acetic acid to the action of ultra-violet radiation, while bubbling through the liquid acid a gas selected from the class consisting of air and oxygen, for a period of time sufficient to convert discoloring agents therein, which are volatile at the boiling point of acetic acid, to a form which is non-volatile at that temperature, and thereafter distilling the so-treated acetic acid.

ARTHUR W. GOOS.
JAMES S. OWENS.